Aug. 15, 1933.  N. KOEHN  1,922,373
VALVE HEAD FOR AIR MOTORS
Filed June 8, 1927
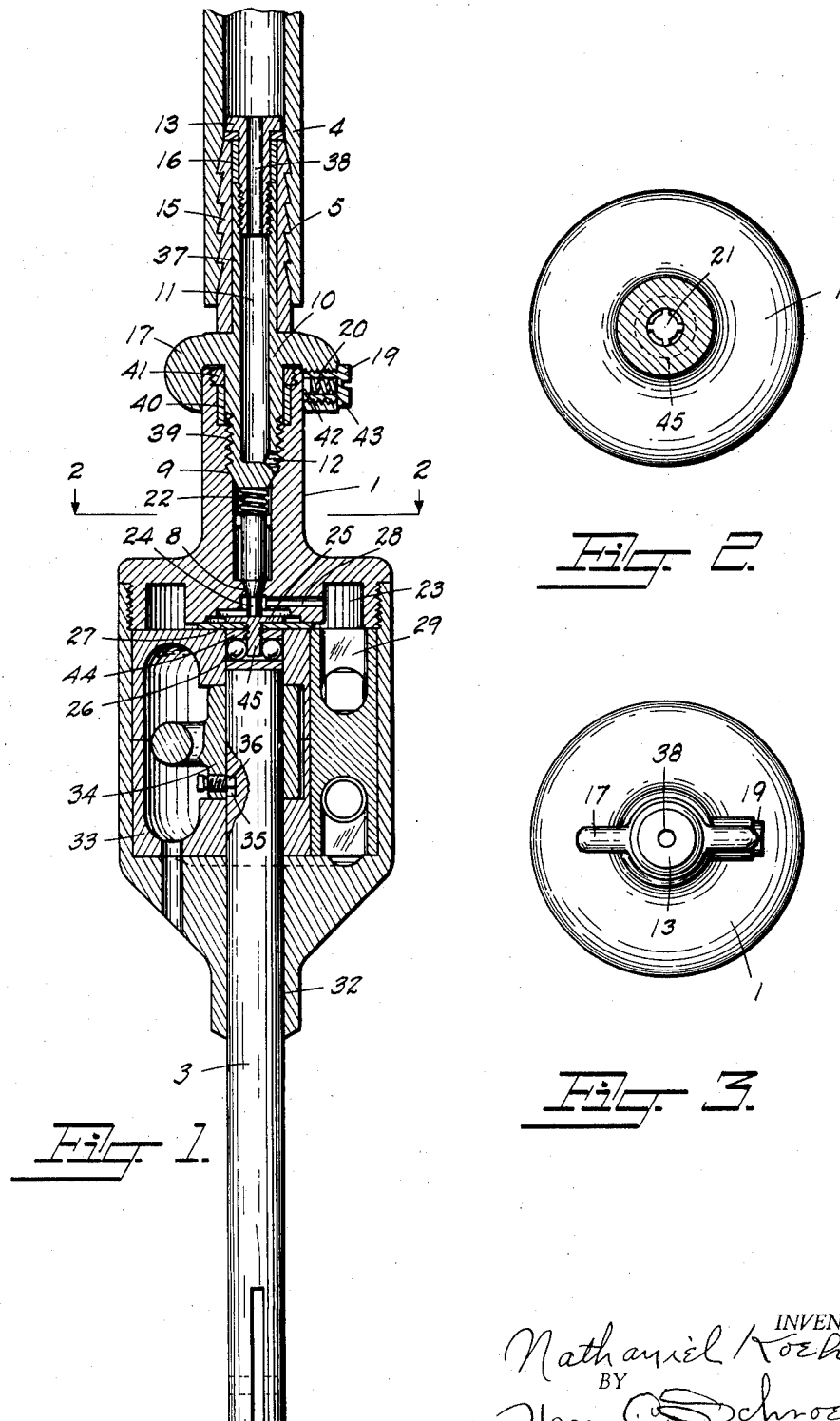
INVENTOR.
Nathaniel Koehn
BY
Harry C. Schroeder
ATTORNEYS.

Patented Aug. 15, 1933

1,922,373

UNITED STATES PATENT OFFICE 1,922,373

VALVE HEAD FOR AIR MOTORS

Nathaniel Koehn, Oakland, Calif.

Application June 8, 1927. Serial No. 197,391

13 Claims. (Cl. 121—11)

This invention is a valve head for fluid motors and is particularly adapted for use with small fluid motors used for grinding valves and for air drills.

The main object of the invention is to provide a valve head having associated therewith controlling means actuated by axial movement of the motor shaft, whereby the flow of fluid to the motor is controlled by axial pressure applied to the shaft.

Another object of this invention is to provide a valve head which is readily adaptable to valve grinding devices, where the speed of and pressure on the shaft of the device are subject to frequent changes.

A further object of the invention is to provide this valve head with adjustable regulating means for regulating the maximum flow of fluid to the controlling means.

A still further object of the invention is to provide a resilient diaphragm for resisting the axial movement of the shaft, and which resilient diaphragm is subjected to the pressure existing between the controlling means and the motor.

A still further object of the invention is to provide the controlling means in the form of a resiliently urged valve, which is actuated by axial movement of the shaft and transmitted through interposed means including the diaphragm, the valve being urged by a spring, the tension of which is coincidently adjusted with adjustment of the regulating means.

Other objects and advantages of the invention will become apparent as the following description is read on the drawing forming a part of this specification, and in which similar reference characters are used to designate similar parts throughout the several views, of which:

Fig. 1 is a sectional elevation through the invention as applied to a valve grinding motor, also shown in section.

Fig. 2 is a section taken on line 2—2 of Fig. 1.

Fig. 3 is a plan view of the invention.

The valve head 1 is indicated as being threadedly secured to the motor casing 2 as indicated at 31.

Rotatably mounted in the motor is a shaft 3, this shaft also being slidable in a bearing 32, and also being slidable in the valve casing 33 and the rotor 34, and being non-rotatably fixed in the rotor 34, the shaft being provided with an elongated slot 35 which cooperates with a dog-point set screw 36, which set screw is threadedly secured in the rotor 34. This form of mounting and securing does not form a part of the invention and may be replaced by any other known means for obtaining the same result.

The fluid supply line consists of a tubular element, such as rubber hose 4, which is secured by means of the usual annularly serrated peripheral surface indicated at 5 formed on the sleeve 15, which forms one part of a swivel joint.

The swivel joint consists of the sleeve 15 which is rotatably mounted on the tubular extension 37, the lower end cooperating with the top surface of the hub of the wing member 17, the sleeve 15 being secured against axial movement by means of a screw 13, which threadedly cooperates with the bore 11 of the extension 37, suitable packing 16 being provided between the head of the screw 13 and the upper end of the member 15 to prevent leakage of air between these members.

The regulating means for regulating the maximum flow of fluid to the motor consists of a valve body 10, the wing 17 being integral with this valve body, the lower end of the valve body terminating in a conical valve 9, having a side outlet passage 12 communicating with the central bore 11, which is in communication with the central bore 38 formed in the screw 13, this valve body threadedly cooperating with the valve head 1 as indicated at 39, suitable packing 40 being secured by means of a nut 41 to prevent leakage of air through the threaded portion.

Frictional securing means is provided for the adjusting and regulating means, and consists of a screw 19 having a central bore 20 in which is slidably mounted a plunger 42, which plunger is resiliently urged by means of a spring 43, the plunger 42 being preferably formed of a material having a high coefficient of friction, this securing means frictionally cooperating with the hub of the valve head as shown in Fig. 1.

From the above, it will be noted that the hose 4 is secured to the valve head by known means and is swively secured to the valve head by means of the screw 13 and valve body 37, and that the regulating valve is frictionally secured by means of the elements 19 and 42, and that also the valve hub is packed against leakage from the valve 9 by means of the packing 40.

The controlling means which is controlled by axial movement of the shaft consists of the valve 8 of frusto-conical form which cooperates with a complementary valve seat, and has an upwardly extending integral portion 21, a spring 22 cooperating between the top surface of the extension 21 and the bottom of the valve 9, whereby adjustment of the valve 9 will vary the tension of the spring 22, opening of the valve 9 decreasing this tension and thereby reducing the pressure required on the shaft for urging the valve 8 to open position. The valve 8 has a depending extension 24 which extension cooperates with the shaft 3 through interposed means so that axial movement of the shaft will raise the valve through the interposed depending extension 24.

The valve head is provided with an annular recess 23 in its undersurface, which recess cooperates with the motor inlet 29 irrespective of the position of this inlet, and a communicating passage 28 communicates between the annular recess 23 and the fluid passage below the valve 8. It will be noted that this fluid passage consists of stepped axial bores with intermediately formed valve seats and that the valve 8 controls the flow of fluid to the motor and the valve is controlled by axial pressure on the shaft and that the maximum flow of fluid is adjusted by means of the valve 9.

The interposed means between the shaft and the depending extension 24 consists of a resilient diaphragm 27 which is secured between the valve head and the motor casing or valve casing, and which resists axial movement of the shaft and coincidently seals the end of the fluid passage or stepped axial bores so that the top surface of the diaphragm is subjected to the pressure existing in the fluid passage between the valve 8 and the annular recess 23. A ball bearing 26 of the thrust type rests on the upper end of the shaft 3, and the upper race 44 of the ball bearing is secured to the diaphragm 27 by means of the securing member 45 which terminates in a head 25 with which the depending projection 24 cooperates, whereby when the shaft 3 is pressed toward the top of a motor, the shaft raises the valve 8 through the interposed means consisting of the ball bearing, the diaphragm, and the clamp screw.

The operation of the device is as follows:

The adjustable member 17 is adjusted to the position where the maximum speed under a specific load is obtained as may be desired, the friction element 42 retaining the valve 9 in adjusted position. As this member is adjusted, the tension of the spring 22 is either increased or decreased, opening of the valve 9 decreasing the tension of the spring and thus decreasing the axial pressure required on the shaft to open the valve 8. Thereafter, pressure on the shaft 3 or downward pressure on the motor housing 2, will cause opening of the valve 8 in proportion to the pressure applied to the shaft, the passage of air through the valve 8 being governed by the opening of the valve 9. The pressure of the air existing underneath the valve 8, which obviously is greater than that in the motor housing, will bear on the diaphragm and resist axial movement of the shaft, this being proportionate to the difference in pressure existing on the opposite sides of the diaphragm, as the shaft is not sealed against the passage of fluid into the space occupied by the ball bearing. The greater the pressure on the shaft 3, the greater the opening provided by the valve 8 and the more fluid will enter the motor, and if the speed of the motor is too great, it is only necessary to slightly let up on the pressure, which due to the decreased flow of fluid into the motor will decrease the speed.

Having described an operative device, it will be understood that variations in the construction and arrangement of parts which are consistent with the appended claims may be resorted to without detracting from the spirit or scope of the invention or sacrificing any of the advantages thereof.

I claim:

1. In combination with an air motor having an axially movable shaft; controlling means for said motor comprising a head having a bore and a spring-urged valve therefor, said valve being controlled by axial movement of the shaft, a diaphragm for resilient counteracting the movement of said shaft subjected to the pressure of the fluid within the bore below the valve, and adjustable means for governing at will the maximum flow of fluid to said valve and coincidently adjusting the spring tension of the spring urged valve, whereby the required axial pressure on the shaft is decreased as the controlled maximum flow of fluid is increased.

2. In combination with an air motor having an axially movable shaft; a control valve for said motor comprising a spring-urged valve having a depending extension and controlled by axial movement of the shaft, interposed means for resiliently counteracting the movement of said shaft, said shaft also being counteracted by the incoming fluid acting on said interposed means, and adjustable means for governing the maximum flow of fluid to said valve and coincidently adjusting the spring tension of the spring-urged valve, whereby the required axial pressure on the shaft is decreased as the controlled maximum flow of fluid is increased, said interposed means consisting of a resilient diaphragm closing the inner end of the through passage, means secured through said resilient diaphragm and cooperating between the top of the shaft and said extension on the valve, and a fluid passage communicating between the through passage and the motor intake and disposed between the valve and the diaphragm.

3. In combination with an air motor having an axially movable shaft; a control valve for said motor comprising a spring-urged valve having a depending extension and controlled by axial movement of the shaft, interposed means for resiliently counteracting the movement of said shaft, said shaft also being counteracted by the incoming fluid acting on the interposed means, and adjustable means for governing the maximum flow of fluid to said valve and coincidently adjusting the spring tension of the spring-urged valve, whereby the required axial pressure on the shaft is decreased as the controlled maximum flow of fluid is increased, said spring-urged valve consisting of a conical plunger valve operating in a through passage and urged to closed position by a spring, said interposed means consisting of a resilient diaphragm closing the inner end of the through passage, means secured through said resilient diaphragm and cooperating between the head end of the shaft and said extension on the valve, and a fluid passage communicating between the through passage and the motor intake and disposed between the valve and the diaphragm.

4. In combination with an air motor having an axially movable shaft; controlling means for said motor comprising a head having a stepped axial bore with intermediately formed valve seat and a control valve therefor, a spring for urging said valve to its seat, an annular recess formed in the under surface of the head, a transverse passage communicating between the annular recess and the axial bore below the valve, a depending extension integral with said valve, and, means interposed between the depending extension and the top of the shaft for resiliently resisting axial movement of the shaft and for sealing the lower end of the bore from the motor, axial pressure applied to the shaft, raising the valve off its seat proportionately to the axial movement of the shaft.

5. In combination with an air motor having an axially movable shaft; controlling means for said motor comprising a head having a stepped axial bore with intermediately formed valve seat and a control valve therefor, a spring for urging said valve to its seat, an annular recess formed in the under surface of the head, a transverse passage communicating between the annular recess and the axial bore below the valve, a depending extension integral with said valve, and, means interposed between the depending extension and the top of the shaft for resiliently resisting axial movement of the shaft and for sealing the lower end of the bore from the motor, axial pressure applied to the shaft, raising the valve off its seat proportionately to the axial movement of the shaft, said interposed means including a resilient diaphragm covering the end of the bore and resiliently resisting axial movement of the shaft and being urged by the fluid pressure in the bore, whereby axial movement of the shaft is partly resisted by the tension of the diaphragm and partly resisted by the difference in fluid pressure existing in the bore and in the motor.

6. In combination with an air motor having an axially movable shaft; controlling means for said motor comprising a head having a stepped axial bore with intermediately formed valve seat and a control valve therefor, a spring for urging said valve to its seat, an annular recess formed in the under surface of the head, a transverse passage communicating between the annular recess and the axial bore below the valve, a depending extension integral with said valve, and, means interposed between the depending extension and the top of the shaft for resiliently resisting axial movement of the shaft and for sealing the lower end of the bore from the motor, axial pressure applied to the shaft, raising the valve off its seat proportionately to the axial movement of the shaft, said interposed means including a resilient diaphragm covering the end of the bore and resiliently resisting axial movement of the shaft and being urged by the fluid pressure in the bore, whereby axial movement of the shaft is partly resisted by the tension of the diaphragm and partly resisted by the difference in fluid pressure existing in the bore and in the motor, said interposed means also including a thrust bearing cooperating with the top of the shaft, and means for clamping the upper member of the bearing to the diaphragm, said clamp member having a head cooperating with the end of the depending extension.

7. In combination with an air motor having an axially movable shaft; controlling means for said motor comprising a head having a stepped axial bore with intermediately formed valve seat and a control valve therefor, a spring for urging said valve to its seat, an annular recess formed in the under surface of the head, a transverse passage communicating between the annular recess and the axial bore below the valve, a depending extension integral with said valve, and, means interposed between the depending extension and the top of the shaft for resiliently resisting axial movement of the shaft and for sealing the lower end of the bore from the motor, axial pressure applied to the shaft, raising the valve off its seat proportionately to the axial movement of the shaft, and, adjustable means for governing at will the maximum flow of fluid to the motor and coincidently decreasing the spring tension of the valve as the controlled maximum flow of fluid is increased, whereby the required axial pressure of the shaft is decreased as the controlled maximum flow of fluid is increased.

8. In combination with an air motor having an axially movable shaft; controlling means for said motor comprising a head having a stepped axial bore with intermediately formed valve seat and a control valve therefor, a spring for urging said valve to its seat, an annular recess formed in the under surface of the head, a transverse passage communicating between the annular recess and the axial bore below the valve, a depending extension integral with said valve, and, means interposed between the depending extension and the top of the shaft for resiliently resisting axial movement of the shaft and for sealing the lower end of the bore from the motor, axial pressure applied to the shaft, raising the valve off its seat proportionately to the axial movement of the shaft, said interposed means including a resilient diaphragm covering the end of the bore and resiliently resisting axial movement of the shaft and being urged by the fluid pressure in the bore, whereby axial movement of the shaft is partly resisted by the tension of the diaphragm and partly resisted by the difference in fluid pressure existing in the bore and in the motor, and, adjustable means for governing at will the maximum flow of fluid to the motor and coincidently decreasing the spring tension of the valve as the controlled maximum flow of fluid is increased, whereby the required axial pressure on the shaft is decreased as the controlled maximum flow of fluid is increased.

9. In combination with an air motor having an axially movable shaft; controlling means for said motor comprising a head having a stepped axial bore with intermediately formed valve seat and a control valve therefor, a spring for urging said valve to its seat, an annular recess formed in the under surface of the head, a transverse passage communicating between the annular recess and the axial bore below the valve, a depending extension integral with said valve, and, means interposed between the depending extension and the top of the shaft for resiliently resisting axial movement of the shaft and for sealing the lower end of the bore from the motor, axial pressure applied to the shaft, raising the valve off its seat proportionately to the axial movement of the shaft, said interposed means including a resilient diaphragm covering the end of the bore and resiliently resisting axial movement of the shaft and being urged by the fluid pressure in the bore, whereby axial movement of the shaft is partly resisted by the tension of the diaphragm and partly resisted by the difference in fluid pressure existing in the bore and in the motor, said interposed means also including a thrust bearing cooperating with the top of the shaft, and means for clamping the upper member of the bearing to the diaphragm, said clamp member having a head cooperating with the end of the depending extension, and, adjustable means for governing at will the maximum flow of fluid to the motor and coincidently decreasing the spring tension of the valve as the controlled maximum flow of fluid is increased, whereby the required axial pressure on the shaft is decreased as the the controlled maximum flow of fluid is increased.

10. In combination with an air motor having an axially movable shaft; controlling means for said motor comprising a head having a stepped axial bore with intermediately formed valve seat and a control valve therefor, a spring for urging said valve to its seat, an annular recess formed in the under surface of the head, a transverse passage communicating between the annular recess and the axial bore below the valve, a depending extension integral with said valve, and, means interposed between the depending extension and the top of the shaft for resiliently resisting axial movement of the shaft and for sealing the lower end of the bore from the motor, axial pressure applied to the shaft, raising the valve off its seat proportionately to the axial movement of the shaft, and, adjustable means for governing at will the maximum flow of fluid to the motor and coincidently decreasing the spring tension of the valve as the controlled maximum flow of fluid is increased, whereby the required axial pressure on the shaft is decreased as the controlled maximum flow of fluid is increased, said adjustable means consisting of an adjustable valve threadedly mounted and communicating with a fluid supply passage and controlling at will the passage of fluid to the control valve, said spring cooperating between the adjustable valve and the control valve, whereby opening of the adjustable valve coincidently increases the supply of fluid, decreases the tension of the spring, and decreases the resistance of the control valve against axial movement of the shaft, and, means for frictionally retaining the adjustable valve in adjusted position.

11. In combination with an air motor having an axially movable shaft; controlling means for said motor comprising a head having a stepped axial bore with intermediately formed valve seat and a control valve therefor, a spring for urging said valve to its seat, an annular recess formed in the under surface of the head, a transverse passage communicating between the annular recess and the axial bore below the valve, a depending extension integral with said valve, and means interposed between the depending extension and the top of the shaft for resiliently resisting axial movement of the shaft and for sealing the lower end of the bore from the motor, axial pressure applied to the shaft, raising the valve off its seat proportionately to the axial movement of the shaft, said interposed means including a resilient diaphragm covering the end of the bore and resiliently resisting axial movement of the shaft and being urged by the fluid pressure in the bore, whereby axial movement of the shaft is partly resisted by the tension of the diaphragm and partly resisted by the difference in fluid pressure existing in the bore and in the motor, and, adjustable means for governing at will the maximum flow of fluid to the motor and coincidently decreasing the spring tension of the valve as the controlled maximum flow of fluid is increased, whereby the required axial pressure on the shaft is decreased as the controlled maximum flow of fluid is increased, said adjustable means consisting of an adjustable valve threadedly mounted and communicating with a fluid supply passage and controlling at will the passage of fluid to the control valve, said spring cooperating between the adjustable valve and the control valve whereby opening of the adjustable valve coincidently increases the supply of fluid, decreases the tension of the spring, and decreases the resistance of the control valve against axial movement of the shaft, and, means for frictionally retaining the adjustable valve in adjusted position.

12. In combination with an air motor having an axially movable shaft; controlling means for said motor comprising a head having a stepped axial bore with intermediately formed valve seat and a control valve therefor, a spring for urging said valve to its seat, an annular recess formed in the under surface of the head, a transverse passage communicating between the annular recess and the axial bore below the valve, a depending extension integral with said valve, and, means interposed between the depending extension and the top of the shaft for resiliently resisting axial movement of the shaft and for sealing the lower end of the bore from the motor, axial pressure applied to the shaft, raising the valve off its seat proportionately to the axial movement of the shaft, said interposed means including a resilient diaphragm covering the end of the bore and resiliently resisting axial movement of the shaft and being urged by the fluid pressure in the bore, whereby axial movement of the shaft is partly resisted by the tension of the diaphragm and partly resisted by the difference in fluid pressure existing in the bore and in the motor, said interposed means also including a thrust bearing cooperating with the top of the shaft, and means for clamping the upper member of the bearing to the diaphragm, said clamp member having a head cooperating with the end of the depending extension, and, adjustable means for governing at will the maximum flow of fluid to the motor and coincidently decreasing the spring tension of the valve as the controlled maximum flow of fluid is increased, whereby the required axial pressure on the shaft is decreased as the controlled maximum flow of fluid is increased, said adjustable means consisting of an adjustable valve threadedly mounted and communicating with a fluid supply passage and controlling at will the passage of fluid to the control valve, said spring cooperating between the adjustable valve and the control valve whereby opening of the adjustable valve coincidently increases the supply of fluid, decreases the tension of the spring, and decreases the resistance of the control valve against axial movement of the shaft, and, means for frictionally retaining the adjustable valve in adjusted position.

13. In combination with an air motor having an axially movable shaft; controlling means for said motor comprising a head having a bore and a spring-urged valve therefor, said valve being controlled by axial movement of the shaft, a diaphragm for resiliently counteracting the movement of said shaft, said diaphragm being subjected to the pressure of the fluid within the bore below the valve, and adjustable means for governing at will, the maximum flow of fluid to said valve and coincidently adjusting the spring tension of the spring-urged valve, whereby the required axial pressure on the shaft is decreased as the controlled maximum flow of fluid is increased, said adjustable means consisting of an adjustable valve threadedly mounted and communicating with a fluid supply passage and controlling at will the passage of fluid to the control valve, said spring cooperating between the adjustable valve and the control valve whereby opening of the adjustable valve coincidently increases the supply of fluid, decreases the tension of the spring, and decreases the resistance of the control valve against axial movement of the shaft, and, means for frictionally retaining the adjustable valve in adjusted position.

NATHANIEL KOEHN.